United States Patent [19]

Maeda et al.

[11] Patent Number: 5,212,810
[45] Date of Patent: May 18, 1993

[54] TERMINAL EQUIPMENT OF A VEHICLE RADIO TELEPHONE SYSTEM

[75] Inventors: Koji Maeda; Yutaka Tomiyori; Shinji Kawamura; Motoyoshi Komoda; Shinobu Okuno; Hiroshi Takizawa, all of Tokyo, Japan

[73] Assignee: NEC Corporation, Japan

[21] Appl. No.: 538,989

[22] Filed: Jun. 15, 1990

[30] Foreign Application Priority Data

Jun. 19, 1989 [JP] Japan .................................. 1-157603
Jul. 26, 1989 [JP] Japan .................................. 1-191364
Jul. 26, 1989 [JP] Japan .................................. 1-193747
Jul. 28, 1989 [JP] Japan .................................. 1-196150
Aug. 17, 1989 [JP] Japan .................................. 1-210669
Feb. 16, 1990 [JP] Japan .................................. 2-35210

[51] Int. Cl.$^5$ ........................... H04B 1/00; H04B 7/00
[52] U.S. Cl. ..................................... 455/58.2; 455/89;
455/181.1; 455/186.1; 379/200; 379/373;
379/396
[58] Field of Search ............... 379/373, 374, 375, 379,
379/200, 61, 63, 396; 455/33, 89, 58.2, 181.1,
186.1

[56] References Cited

U.S. PATENT DOCUMENTS 4,481,382 11/1984 Villa-Real .............................. 379/61
4,511,765 4/1985 Kuo ..................................... 379/200
4,585,904 4/1986 Mincone et al. ..................... 379/200
4,982,424 1/1991 Saito et al. ........................... 379/396

FOREIGN PATENT DOCUMENTS 0162162 9/1983 Japan ................................... 379/373
0248858 10/1989 Japan ................................... 379/200

OTHER PUBLICATIONS

Brassart, An "Anti-Intercity" Telephone Device, Toute L'Électronique (France), No. 443 (May 1979).

Primary Examiner—Reinhard J. Eisenzopf
Assistant Examiner—Timothy H. Keough
Attorney, Agent, or Firm—Laff, Whitesel, Conte & Saret

[57] ABSTRACT

Terminal equipment having transmitting and receiving functions for a vehicle radio telephone system has a function thereof limited to one of a plurality of modes depending on the time zone. The equipment is automatically locked when a predetermined period of time expires after the end of a communication. The area wherein a call can be originated on the equipment is limited to one of local, domestic and international areas on the basis of the time zone. A memory has a plurality of addresses each being loaded with a particular telephone number to allow the single equipment to selectively use a plurality of telephone channels, on the basis of the time zone. A plurality of memories each stores a particular speed call number table or a particular unattended telephone message table, so that the tables are selectively used depending on the time zone. Further, the volume level of an alert tone to be produced on the reception of a call and the illumination for a keyboard and a display are controlled on the basis of the time zone.

17 Claims, 8 Drawing Sheets

Fig. 4A

LOCKING & UNLOCKING

POWER ON — S21

S22 — EEPROM1 INDICATING LOCKED STATE?
- YES → LOCK EQUIPMENT 30 — S23
- NO → READ TIME To OUT OF EEPROM2 — S24

S25 — $T_n - T_o \geq P$ ?
- YES → LOAD EEPROM1 WITH LOCKD STATE — S26 → LOCK EQUIPMENT 30 — S27
- NO → UNLOCK EQUIPMENT 30 — S28

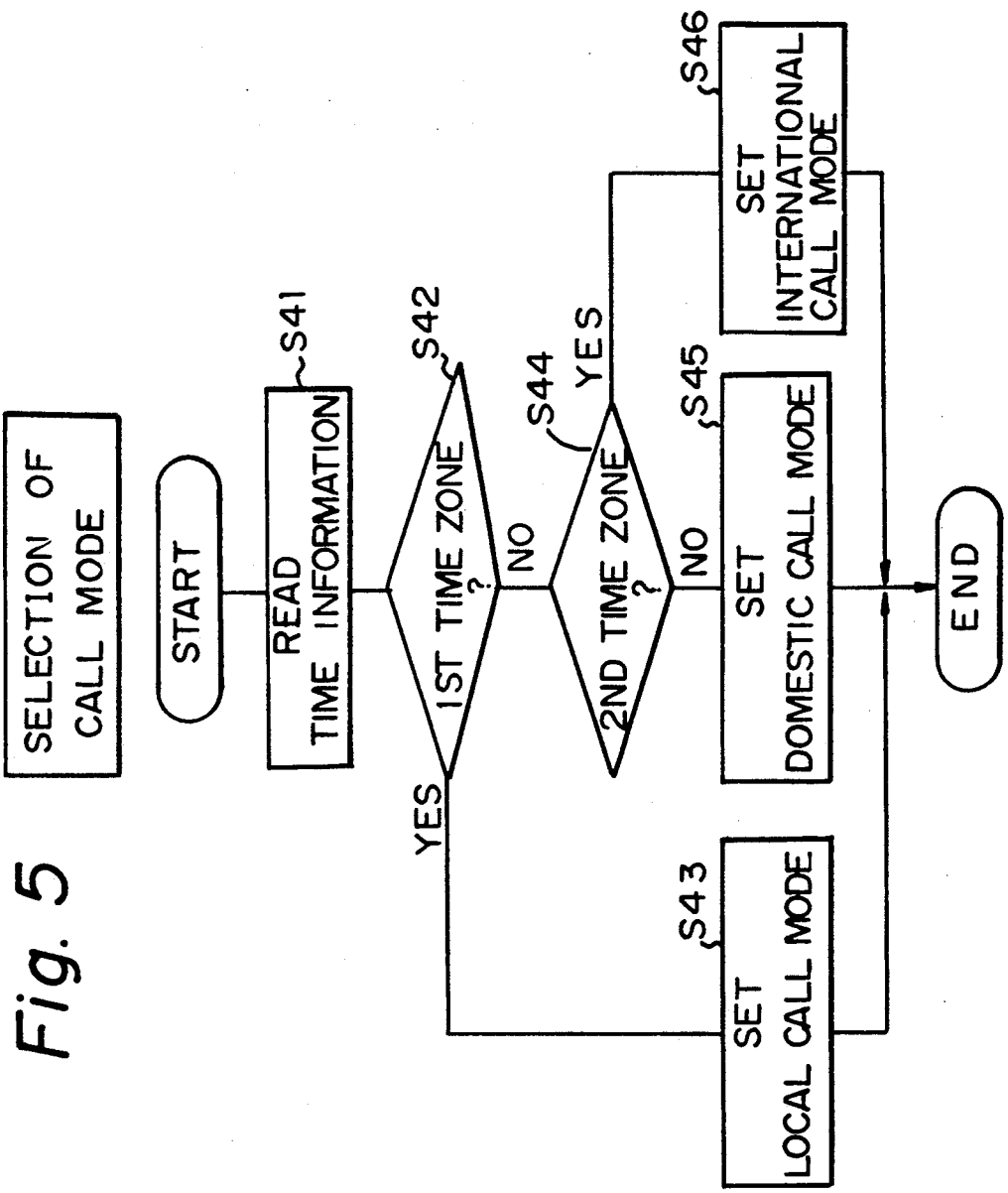

TERMINAL EQUIPMENT OF A VEHICLE RADIO TELEPHONE SYSTEM

BACKGROUND OF THE INVENTION

The present invention relates to a mobile radio telephone system and, more particularly, to an improvement in terminal equipment of a vehicle radio telephone system.

A vehicle radio telephone system or similar mobile radio telephone system is extensively used today. This kind of telephone system includes terminal equipment each being controlled by a control section thereof which is implemented as a CPU, for example. Conventional terminal equipment for use in a vehicle radio telephone system has some problems left unsolved and some points which need improvements, as enumerated below.

(1) A vehicle radio telephone system has higher fees for calls than the other wire telephone systems because it uses electromagnetic waves which is the finite resource. In the light of this, it is a common practice to provide terminal equipment with a locking function for preventing unauthorized persons from using the equipment. The locking function is such that the equipment can be readily locked by any person allowed to use the equipment, but it cannot be unlocked unless a confidential unlocking code known only by the owner or the administrator is inputted to the equipment. The owner, administrator or similar authorized person, however, has to lock the equipment every time the person leaves the vehicle on which the equipment is mounted, so that the terminal may be prevented from being used by unauthorized persons when the vehicle is stolen. This, coupled with the fact that the authorized person has to lock the equipment every time he or she uses it, forces the authorized person to take extreme care in locking the equipment and thereby increases the mental burden.

(2) Some terminal equipment heretofore proposed for a vehicle radio telephone system have functions of limiting the area in which a call can be originated on the equipment, i.e., a function of limiting allowable calls only to local calls, a function of limiting them only to local and domestic calls, and a function of allowing all of the local, domestic and international calls. These three functions are selectively set up one at a time so as to prevent long-distance calls from being freely originated on the equipment. Of course, all of such limiting functions are set up only when a code number known exclusively by the authorized person is keyed in or otherwise inputted. For example, assume that a certain firm owns the terminal equipment, and that the communication area in which the persons expected to use the equipment, is a local area, and that these persons are employees who communicate for business transactions. Then, the administrator of the firm may limit the communicable area of the equipment to the local area for the purpose of inhibiting, for example, private calls meant for areas other than the expected business area such as long-distance calls and international calls which are expensive. This is successful in freeing the firm from wasteful expenditure and losses. A problem is, however, that every time the administrator allows an employee to use the equipment, the administrator has to set the communicable area again later. This is more pronounced when single terminal equipment is shared by a plurality of persons who are engaged in different kinds of work, e.g., when it is used in the morning by a person who needs only local calls, in the afternoon by another person who needs domestic calls, and at night by another person who needs international calls.

(3) In a vehicle radio communication system, a single identification (ID) code or telephone number is assigned to each terminal unit, and communications are held by using a single channel associated with the telephone number. Hence, a plurality of channels cannot be used unless the same number of terminal equipment as the channels are available. This prevents single terminal equipment from being used for different purposes on a time zone basis. Specifically, it is not practicable to connect single equipment to a certain channel in the daytime for a particular purpose and connect it to another channel in the nighttime for another purpose.

(4) The terminal equipment to which a single channel or telephone number is assigned as stated above is provided with a single memory. Hence, the content of data to be stored in the memory cannot be increased without resorting to extra telephone numbers which would complicate the operations of the equipment. Further, when the content of data to be stored in the memory differs from one time zone to another, all the contents have to be collectively stored in the single memory. It is difficult, therefore, to selectively read the stored contents out of the memory.

(5) Usually, the terminal equipment of a vehicle radio telephone system is not provided with a function of sensing light inside the vehicle cabin. Therefore, when the vehicle cabin is not illuminated in the evening or at night, the equipment is hard to operate because the space around the equipment is dark. To solve this drawback, it has been customary to continuously illuminate a keyboard provided on the equipment and a liquid crystal display a predetermined interval after the turn-on of the power source of the equipment or after a particular key on the keyboard has been pressed. It follows that the illumination is effected over the above-mentioned interval when the space around the equipment is light enough and does not need illumination, whereby the life of the power source or battery of the equipment is reduced.

(6) On reception of a call, the conventional terminal equipment generates an alert tone of predetermined volume at all times. Hence, when it is desired to change the set volume level in matching relation to the conditions in which the equipment is used, e.g., to select a medium volume level in the early morning, a high volume level in the daytime, and a low level volume in the nighttime, the volume level of the alert tone has to be switched over each time.

SUMMARY OF THE INVENTION

It is therefore a first object of the present invention to provide terminal equipment for a vehicle radio telephone system which is automatically locked each time it is used, without resorting to the owner's or similar authorized person's operations.

It is a second object of the present invention to provide terminal equipment for a vehicle radio telephone system which automatically selects and limits the area in which a call can be originated on the equipment, on the basis of a time zone.

It is a third object of the present invention to provide terminal equipment for a vehicle radio telephone system which is capable of using a plurality of channels.

It is a fourth object of the present invention to provide terminal equipment for a vehicle radio telephone system which increases the amount of contents which can be stored in a memory, despite the assignment of a single telephone channel or telephone number.

It is a fifth object of the present invention to provide terminal equipment for a vehicle radio telephone system which controls the illumination of a keyboard and a LCD, depending on the time zone.

It is a sixth object of the present invention to provide terminal equipment for a vehicle radio telephone system which automatically changes the volume level of an alert tone on the basis of the time zone.

Terminal equipment having transmitting and receiving functions for a vehicle radio telephone system of the present invention comprises a timepiece circuit for counting time to produce time information, a transmitter/receiver section for causing a communication to be held at the time of transmission and reception, and a control section for controlling operations of the transmitter/receiver section in response to the time information from the timepiece circuit and thereby limiting a function of the terminal equipment to one of a plurality of predetermined modes.

BRIEF DESCRIPTION OF THE DRAWINGS

The above and other objects, features and advantages of the present invention will become more apparent from the following detailed description taken with the accompanying drawings in which:

FIGS. 4, 4a and 4b is a flowchart demonstrating locking and unlocking operations of the illustrative embodiment;

FIG. 5 is a flowchart representative of a second embodiment of the present invention;

DESCRIPTION OF THE PREFERRED EMBODIMENTS

Preferred embodiments of the terminal equipment of a vehicle radio telephone system in accordance with the present invention will be described with reference to the accompanying drawings.

FIRST EMBODIMENT

Figure 1:
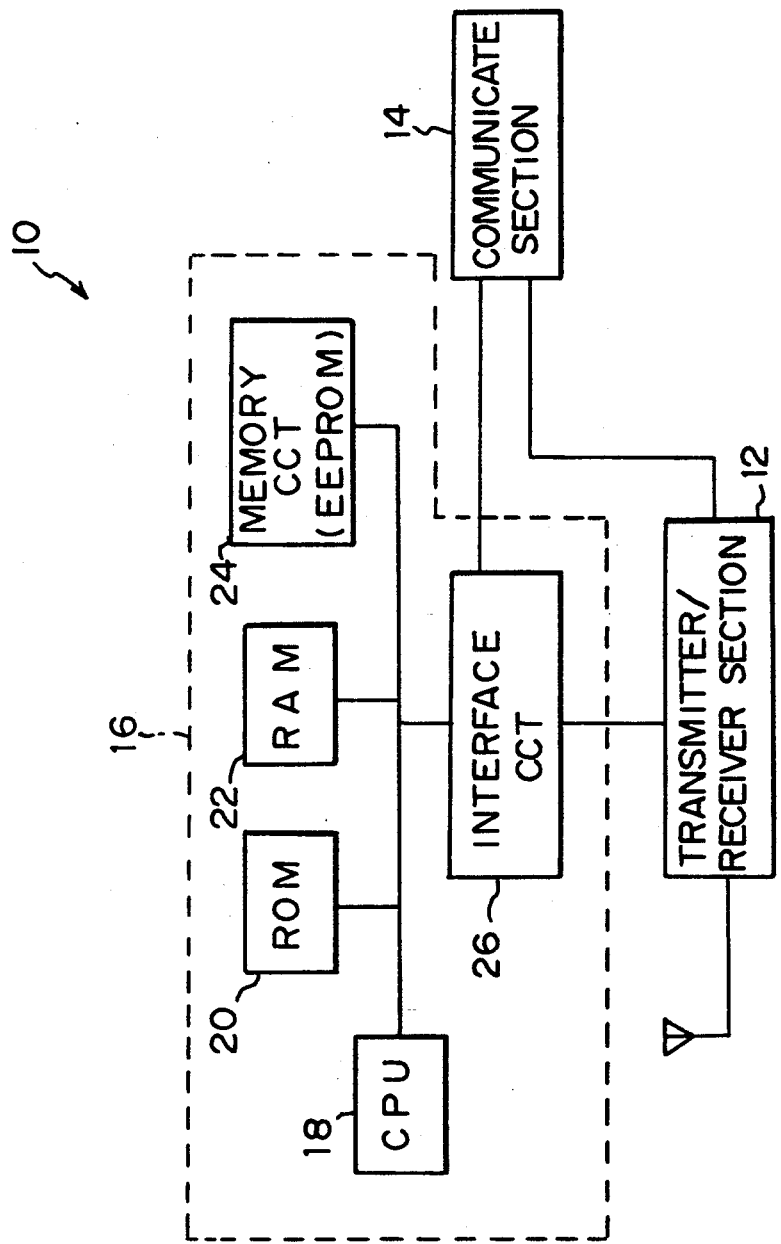
FIG. 1 is a block diagram schematically showing terminal equipment of a prior art vehicle radio telephone system.

This embodiment contemplates to accomplish the first object of the present invention mentioned earlier. To better understand the illustrative embodiment, prior art terminal equipment having a locking function will be described, shown in FIG. 1. As shown, the prior art terminal equipment, generally 10, has a transmitter/receiver section 12 having transmitting and receiving functions, a communicating section 14 having a communicating function, and a control section 16 connected to the two sections 12 and 14. The control section or controller 16 may be implemented by a CPU 18, a ROM 20, a RAM 22, a memory circuit 24 comprising an EEPROM, and an interface circuit 26. Regarding the EEPROM of the memory circuit 24, use may be made of a writable ROM or a RAM which is backed up by a battery or a capacitor.

Figure 2:
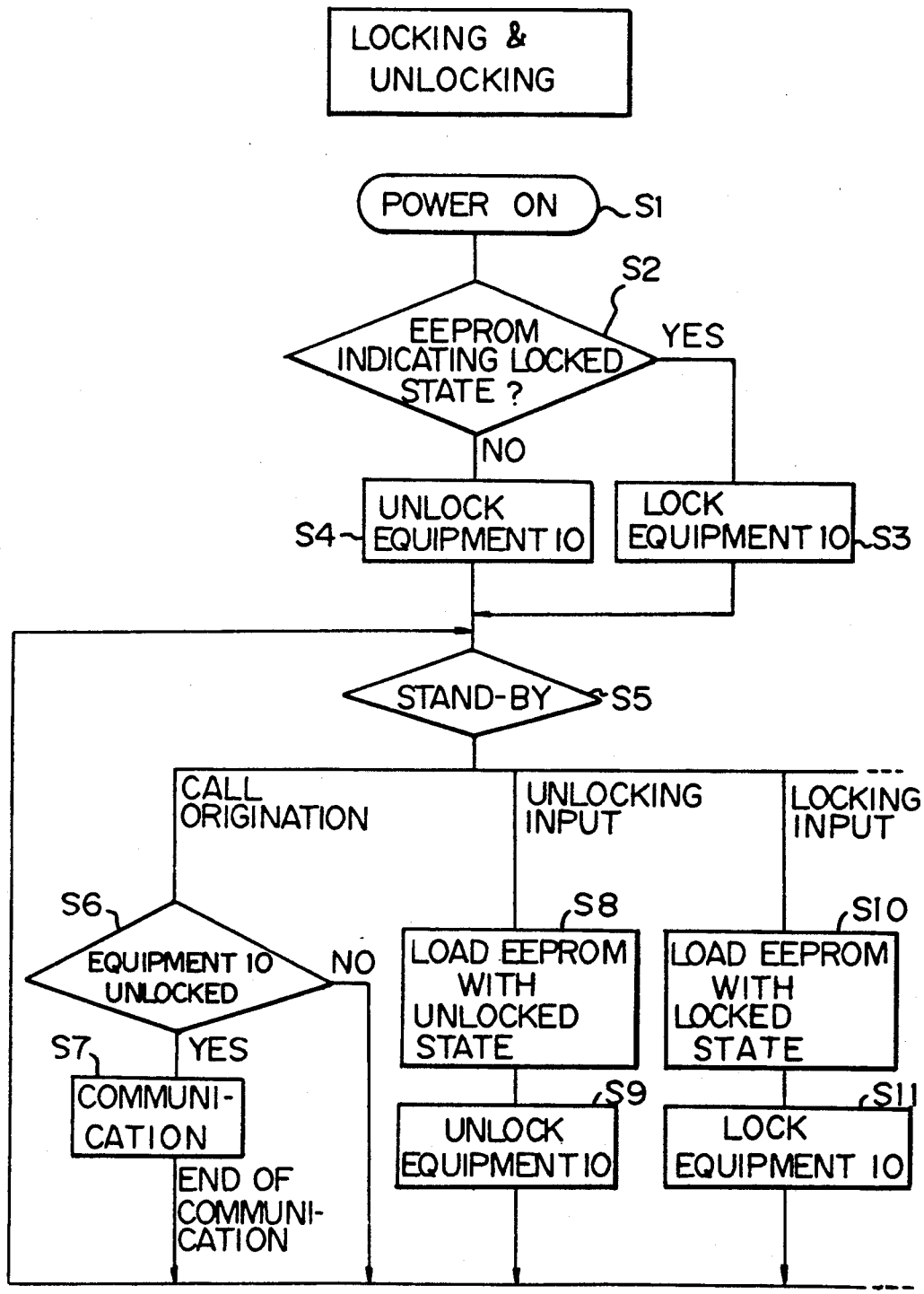
FIG. 2 is a flowchart representative of locking and unlocking operations of the equipment shown in FIG. 1.

FIG. 2 is a flowchart representative of locking and unlocking operations particular to the terminal equipment 10. When the power source is turned on (step S1), the content of the EEPROM of the memory circuit 24 is read out to see if it indicates a locked state (step S2). If the answer of the step S2 is YES, the equipment 10 is locked (step S3); if otherwise, it is unlocked (step S4). Thereafter, the equipment 10 is held in a stand-by state (step S5). When the user of the equipment 10 desires to originate a call, whether or not the equipment 10 is in an unlocked state is determined (step S6). If the answer of the step S6 is YES, the user is allowed to start on a communication (step S7). On completion of the communication, the program returns to the step S5. If the answer of the step S6 is NO, the user may unlock the equipment 10 by inputting an unlocking signal to the EEPROM of the memory circuit 24 to unlock the content thereof (step S8) and thereby the equipment 10 (step S9). Then, the equipment 10 allows the user to originate a call by way of the steps S5 and S6. On the other hand, the user may lock the equipment 10 by inputting a locking signal to the EEPROM to lock its content (step S10) and thereby the equipment 10 (step S11), then the program returning to the step S5.

As stated above, the prior art terminal equipment 10 forces the user to lock and unlock it by confirming the locked/unlocked state every time the user desires to originate a call, resulting in troublesome operations.

Figure 3:
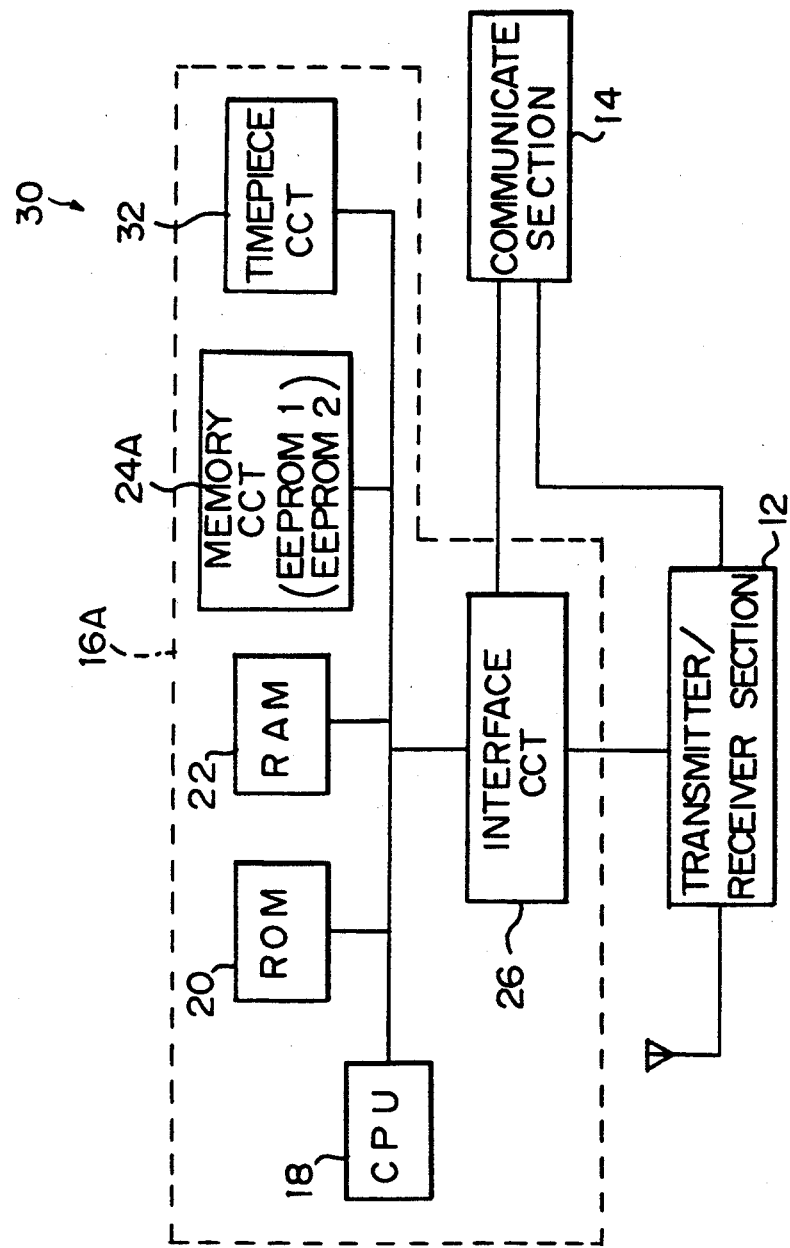
FIG. 3 is a block diagram schematically showing a first embodiment of the terminal equipment of a vehicle radio telephone system in accordance with the present invention.
Figure 4B:
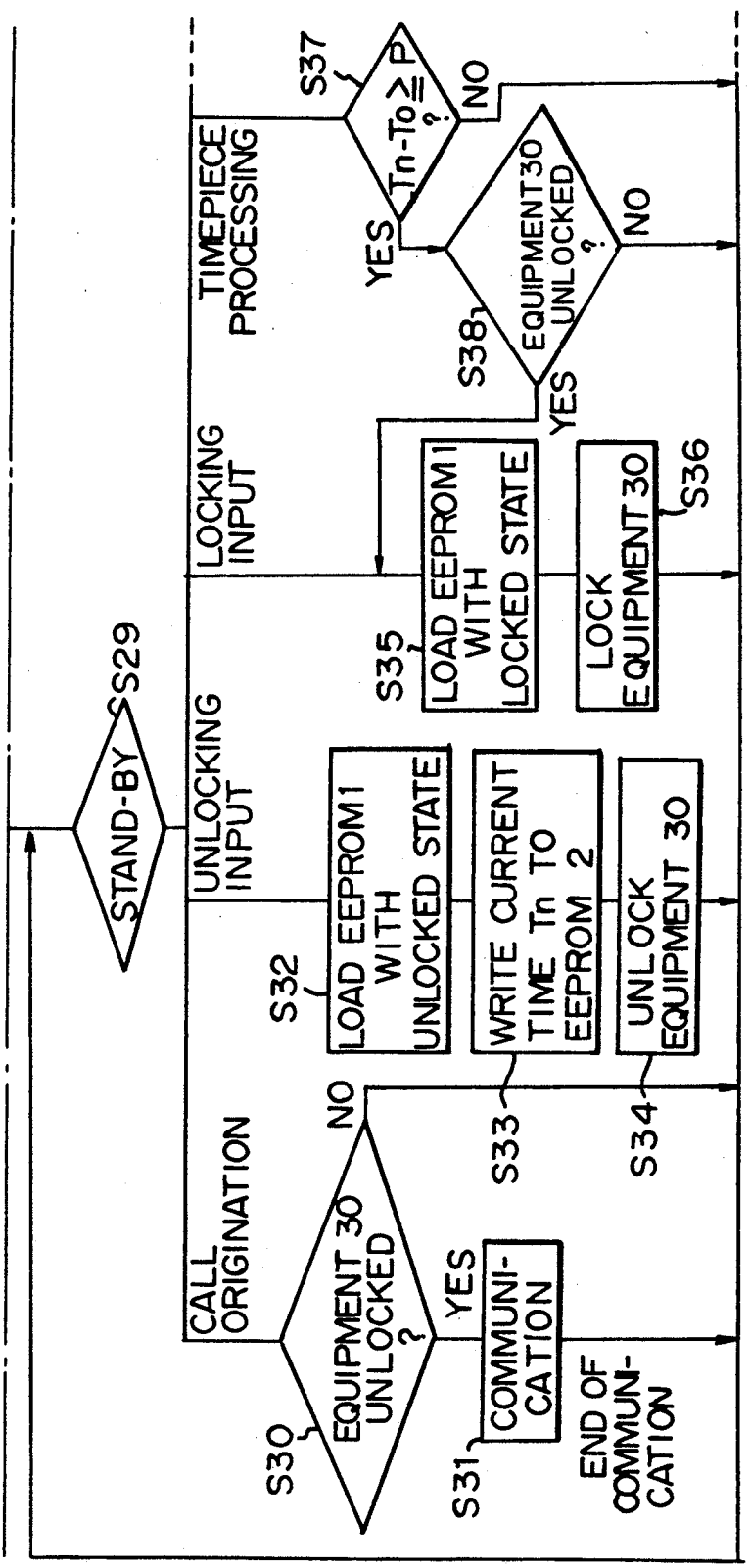

FIGS. 3 and 4 show the first embodiment of the present invention. In the figures, similar components are designated by the same reference numerals, and redundant description will be avoided for simplicity. In FIGS. 3 and 4, the terminal equipment 30, like the prior art equipment 10, has a transmitter/receiver section 12, a communicating section 14, and a control section 16A. The control section or controller 16A is made up of a CPU 18, a ROM 20, a RAM 22, a memory circuit 24A having EEPROMS 1 and 2, an interface circuit 26, and a timepiece circuit 32. Specifically, the control section 16A is different from the conventional control section 16 in that the memory circuit 24A has two EEPROMs 1 and 2, and in that the timepiece circuit 32 implemented by quartz, for example, counts time and thereby produces time information. The equipment 30, therefore, has one or both of two different functions, i.e., a function of automatically locking the equipment 30 when a predetermined period of time as counted by the timepiece circuit 32 expires after the equipment 30 has been unlocked, and a function of automatically locking the equipment 30 when more than a predetermined period of time elapses after the equipment 30 has been unlocked with a power source thereof having been turned on. The timepiece circuit 32 is backed up by a battery or a capacitor so as to continuously operate even after the power source has been turned off. The locking and unlocking operations of the terminal equipment 30 will be described with reference to FIG. 4 specifically.

In FIG. 4, on the turn-on of the power source (step S21), the content of the EEPROM 1 of the memory circuit 1 is read out to see if it indicates a locked state (step S22). If the answer of the step S22 is YES, the equipment is locked (step S23). If otherwise, the content of the other EEPROM 2, i.e., the time To when the equipment 30 has been unlocked last is read out (step S24) to see if the interval between the time To and the current time Tn (Tn−To) is equal to or greater than a predetermined period of time P (step S25). If the answer of the step S25 is YES, meaning that the predetermined period of time P has expired, the content of the EEPROM 1 and, therefore, the equipment 30 is locked (steps S26 and S27). If the answer of the step S25 is NO, the equipment is unlocked (step S28) and is brought to a stand-by state (step S29). When the user of the equipment 30 desires to originate a call, the user determines whether or not the equipment 30 is in an unlocked state (step 30). If the answer of the step S30 is YES, the user may start on a communication immediately (step S31). Then, on completion of the communication, the program returns to the step S29. If the answer of the step S30 is NO, the user may unlock the equipment 30 by inputting an unlocking signal to the EEPROM 1 to unlock its content (step S32), then causing the current time Tn to be written to the other EEPROM 2 (step S33), and then unlocking the equipment (step S34). So unlocked, the equipment 30 allows the user to originate a call by way of the steps S29 and S30. To lock the equipment 30, the user inputs a locking signal to the EEPROM 1 to lock its content (step S35) and thereby the equipment 30 (step S36), then the program returning to the step S29. The controller 16A starts on a timepiece processing operation in response to the output of the timepiece circuit 32. Specifically, whether or not the predetermined period of time P has expired from the time To of the last unlocking of the equipment 30 to the current time Tn is determined (step S37). If the answer of the step S37 is YES, whether or not the equipment 30 is still in an unlocked state is determined (step S38). If the answer of the step S38 is YES, the step S35 is executed; if otherwise, the program returns to the step S29.

As stated above, when more than a predetermined period of time elapses after the equipment 30 has been unlocked, the equipment is locked automatically. Therefore, even when the user has left the vehicle on which the equipment 30 is mounted without locking the equipment 30 and the vehicle has been stolen later, the equipment 30 is prevented from being used by persons other than the authorized user.

SECOND EMBODIMENT

A second embodiment achieves the second object of the present invention by automatically selecting and limiting the area in which a call can be originated on terminal equipment, on the basis of the time zone. While the second embodiment is essentially the same as the first embodiment so far as the general construction is concerned, the former is different from the latter regarding the manner of control.

Specifically, as shown in FIG. 3, the CPU 18 of the controller 16A reads time information out of the timepiece circuit 32 and feeds a control signal matching the time to the transmitter/receiver section 12. In this particular embodiment, the transmitter/receiver section 12 has not only ordinary transmitting and receiving functions but also a mode selecting function. The mode selecting function is such that, in response to the control signal from the CPU 18, the transmitter/receiver section 12 selects only one of a local call mode, a domestic call mode, and an international call mode. In the local, domestic and international call modes, only the local, domestic and international communications, respectively, are enabled.

FIG. 5 indicates the operation of the second embodiment, particularly the procedure for selecting one of the three different modes depending on the time zone. First, the CPU 18 reads time information out of the timepiece circuit 32 (step S41) to see if it lies in a first predetermined time zone, e.g. 9.00 am to 5.00 pm in the illustrative embodiment (step S42). If the answer of the step S42 is YES, a control signal for setting up the local call mode is applied to the transmitter/receiver section 12 so as to condition the equipment for the local call mode (step S43). If the answer of the step S42 is NO, whether or not the time information lies in a second predetermined time zone, i.e., 10.00 pm to 7.00 am in the illustrative embodiment is determined (step S44). If the answer of the step S44 is NO, a control signal for setting up the domestic call mode is fed to the transmitter/receiver section 12 in order to condition the equipment for the domestic call mode (step S45). If the answer of the step S44 is YES, a control signal for selecting the international call mode is applied to the transmitter/receiver section 12 to cause the equipment into the international call mode (step S46).

As stated above, the second embodiment selects a particular communicable area in association with each of a plurality of predetermined time zones. This is successful in preventing unauthorized persons from originating calls meant for inhibited areas on the terminal equipment.

Of course, the call modes and time zones stated above are only illustrative and may be increased or decreased in matching relation to a particular application.

THIRD EMBODIMENT

Figure 6:
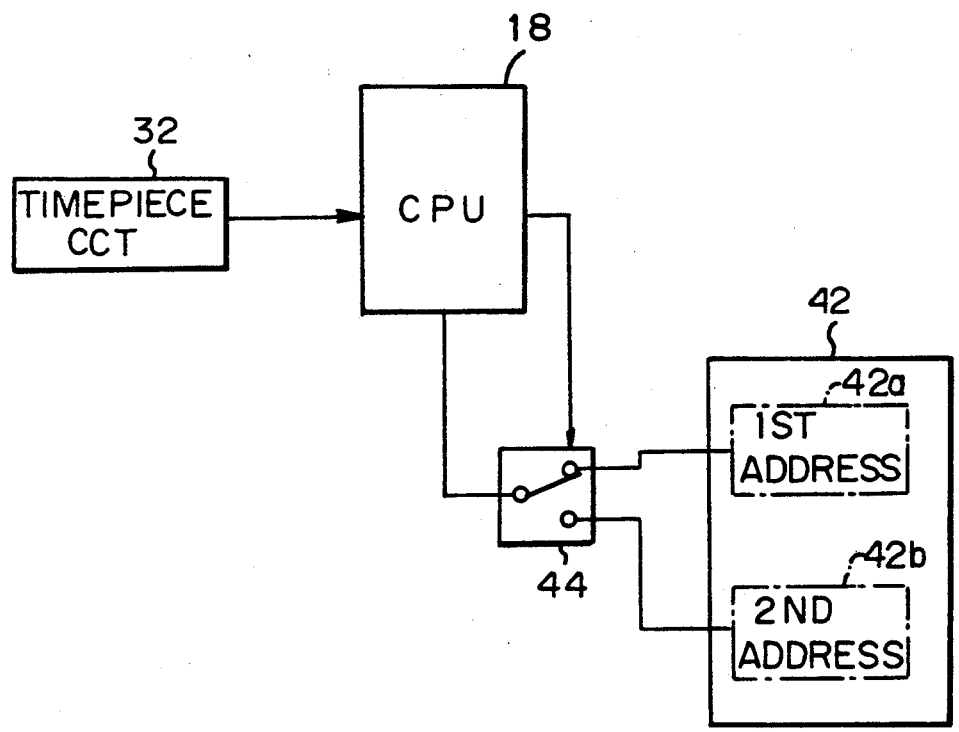
FIG. 6 is a block diagram schematically showing third and fourth embodiments of the present invention.

This embodiment achieves the previously mentioned third object of the present invention by allocating a plurality of channels to single terminal equipment. The third embodiment is also essentially similar in construction to the first embodiment of FIG. 3, so that only an essential part thereof, i.e., a control section will be described with reference to FIG. 6. As shown, the control section has, in addition to the timepiece circuit 32 and CPU 18, a memory 42 and a switch 44 interposed between the memory 42 and the CPU 18. The memory 42 has a first address 42a and a second address 42b which store first and second identification (ID) codes, respectively. In this particular embodiment, the ID codes stored in the individual memory addresses are different telephone numbers. The switch 44 selectively connects the CPU 18 to either one of the first and second memory addresses 42a and 42b. The CPU 18 is loaded with first and second time codes for switching over the connection of the switch 44. Specifically, the CPU 18 reads time information out of the time piece circuit 32. If the read time information is coincident with the first time code, the CPU 18 delivers a first control signal to the switch 44 to thereby connect the first address 42a of the memory 42 to the switch 44. As a result, the first ID code or telephone number is fed from the address 42a to the CPU 18, whereby the terminal equipment will operate with the first telephone number thereafter. On the other hand, when the time information is coincident with the second time code, a second control signal is fed to the switch 44 to connect the second address 42b to the switch 44, thereby selecting the second ID code or telephone number stored in the address 42b. Then, the CPU 18 causes the equipment to operate with the second telephone number in place of the first one. Of course, the number of addresses of the memories 42 may be increased, as desired.

As stated above, the third embodiment allows single terminal equipment to selectively use a plurality of telephone numbers depending on the time zone. For example, one telephone number may be assigned to the equipment in the daytime for business use, while another telephone number may be assigned in the nighttime for private use. Such a configuration is readily implemented although the fee for telephone calls may be increased with the number of lines.

FOURTH EMBODIMENT

Contemplated to achieve the fourth object, a fourth embodiment increases the amount of data to be stored in a memory included in terminal equipment to which a single telephone channel or telephone number is assigned. This embodiment is essentially the same as the third embodiment as to the construction of the control section, FIG. 6, and, therefore, will be described with reference to FIG. 6. In this case, however, the memory 42 should be translated into a memory circuit 42, and the first and second addresses 42a and 42b should be translated into first and second memories 42a and 42b, respectively. Specifically, the first and second memories 42a and 42b each is loaded with a particular content. For example, the memory 42a stores a first speed call number table mainly for daytime time, while the memory 42b stores a second speed call number table mainly for nighttime use. The memories 42a and 42b may further store respectively first and second unattended telephone message tables adapted for daytime and nighttime.

In operation, the CPU 18 reads time information out of the timepiece circuit 32 and, if it lies in a predetermined time zone corresponding daytime, feeds a first control signal to the switch 44. Then, the CPU 18 is connected to the first memory 42a so that the equipment is operable with the first speed call number table or the first unattended telephone message table. If the time information lies in another predetermined time zone corresponding to nighttime, the CPU 18 delivers a second control signal to the switch 44. In this condition, the CPU 18 is connected to the second memory 42b, causing the equipment to operate with the second speed call number table or the second unattended telephone message table. Of course, the number of memories may be increased to increase the number of contents to be stored.

As stated above, with this particular embodiment, it is possible to provide single terminal equipment having a single channel or telephone number with a plurality of memories and to switch over the memories depending on the time zone. Hence, the amount of data to be stored, i.e., the amount of control data is increased.

FIFTH EMBODIMENT

Figure 7:
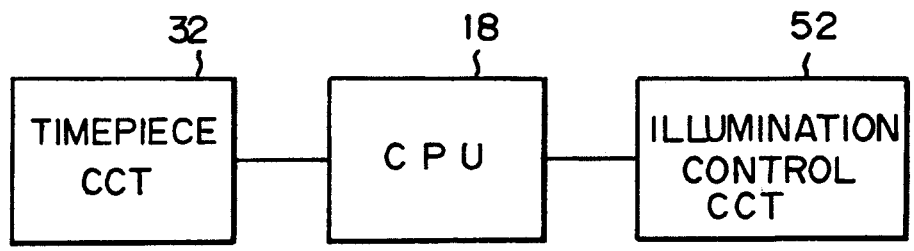
FIG. 7 is a block diagram shematically showing a fifth embodiment of the present invention.

This embodiment achieves the fifth object of the present invention by controlling the illumination of a keyboard provided on terminal equipment and a liquid crystal display (LCD), depending on the time zone. The illustrative embodiment has a control section which is essentially similar to the control section of FIG. 3, so that only an essential part thereof will be described with reference to FIG. 7. As shown, the CPU 18 controls an illumination control circuit 52 which controllably illuminates keys provided on a keyboard of terminal equipment and a LCD section. The CPU 18 reads time information out of the timepiece circuit 32 to see if it lies in a particular time zone for turning on the illumination. If it does lie in such a time zone, the CPU 18 feeds a control signal to the illumination control circuit 52 to illuminate the LCD section. If otherwise, the CPU 18 does not feed the control signal to the circuit 52 and thereby inhibits the circuit 52 from turning on the illumination. Specifically, the illumination may be turned on from evening to morning and turned off from morning to evening.

In this manner, the fifth embodiment eliminates wasteful illumination by determining whether or not illumination is necessary on the basis of the time zone, thereby extending the service life of a power source or battery.

SIXTH EMBODIMENT

Figure 8:
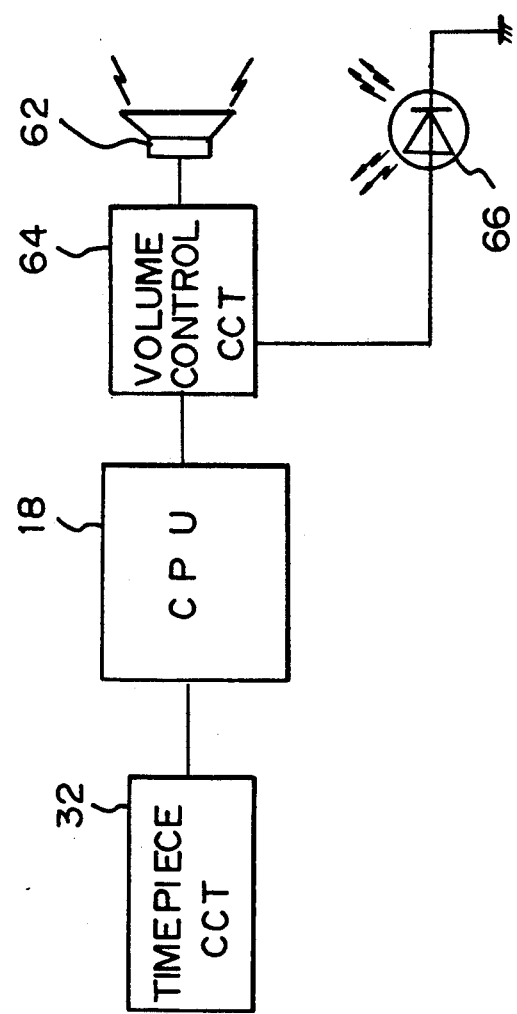
FIG. 8 is a block diagram schematically showing a sixth embodiment of the present invention.

Contemplated to achieve the sixth object, this embodiment automatically changes the volume level of an alert tone in the event of the reception of a call, depending on the time zone. Since the control section has essentially the same construction as the control section of FIG. 3, only an essential part thereof will be described with reference to FIG. 8. As shown, the CPU 18 is connected to a volume control circuit 64 which controls a loudspeaker 62 incorporated in a housing of terminal equipment for generating an alert tone. Also connected to the volume control circuit 64 is a LCD 66. The CPU 18 reads time information out of the timepiece circuit 32 and, based on this information, controls the volume of an alert tone to be outputted by the loudspeaker 62 to one of a plurality of predetermined levels. For example, the CPU 18 may select a medium volume level in the early morning, a high volume leve in the daytime, and a low volume level in the nighttime. Alternatively, the volume control circuit 64 may be so controlled as to cause the LCD 66 to alert the user to the reception of a call while maintaining the loudspeaker 62 silent.

Various modifications will become possible for those skilled in the art after receiving the teachings of the present disclosure without departing from the scope thereof.

What is claimed is:

1. Terminal equipment having transmitting and receiving functions for a vehicle radio telephone system, comprising:

timepiece means for counting time to produce time information:

transmitter/receiver means for causing a communication to be held at the time of transmission and reception;

locking means for locking the operations of said transmitter/receiver means;

control means for controlling operations of said transmitter/receiver means in response to the time information from said timepiece means and thereby limiting a function of said terminal equipment to one of a plurality of predetermined modes, said control means controlling in response to the time information, said locking means and said transmitter/receiver means such that said equipment is locked when a predetermined period of time expires after either locking of said transmitter/receiver means by said locking means has been cancelled, or after a power source of said equipment has been turned on and locking of said transmitter/receiver means by said locking means has been cancelled.

2. Equipment as claimed in claim 1, wherein said transmitter/receiver means is selectively operable in a plurality of communication modes including at least a local communication mode, a domestic communication mode, and an international communication mode.

3. Equipment as claimed in claim 2, wherein said control means controls, in response to the time information, said transmitter/receiver means such that said transmitter/receiver means operates in the local communication mode when a current time indicated by the time information lies in a first time zone, in the domestic communication mode when said current time lies in a second time zone, and in the international communication mode when said current time lies in a third time zone.

4. Equipment as claimed in claim 1, further comprising memory means responsive to said timepiece means and having a plurality of memory addresses each storing a particular identification code, and selecting means for selecting said plurality of memory addresses one at a time.

5. Equipment as claimed in claim 4, wherein said identification codes comprise telephone numbers representative of telephone channels.

6. Equipment as claimed in claim 5, wherein said control means controls, in response to the time information, said selecting means such that particular one of the telephone numbers associated with a time zone in which a current time indicated by the time information lies is selected.

7. Equipment as claimed in claim 1, further comprising a plurality of memory means responsive to said timepiece means and each storing particular control data, and selecting means responsive to said control means for selecting said plurality of memory means one at a time.

8. Equipment as claimed in claim 7, wherein said control means controls, in response to the time information, said selecting means such that a particular one of said plurality of memory means loaded with control data which is associated with a time zone in which a current time indicated by the time information lies is selected for communication with another transmitter/receiver means.

9. Equipment as claimed in claim 8, wherein the control data comprise multiple speed call number tables.

10. Equipment as claimed in claim 8, wherein the control data comprise multiple unattended telephone message tables.

11. Equipment as claimed in claim 1, further comprising illumination control means responsive to said timepiece means for controllably illuminating part of said equipment.

12. Equipment as claimed in claim 11, wherein said control means controls, in response to the time information, said illumination control means such that said illumination control means turns on and off illumination depending on a time zone in which a current time indicated by the time information lies.

13. Equipment as claimed in claim 12, wherein a time zone for turning on the illumination and a time zone for turning off the illumination are evening to morning and morning to evening, respectively.

14. Equipment as claimed in claim 1, further comprising volume control means responsive to said timepiece means for controlling, on reception of a call, an alert tone to one of a plurality of predetermined volume levels.

15. Equipment as claimed in claim 14, wherein said control means controls, in response to the time information, said volume control means such that said volume control means selects particular one of the plurality of predetermined volume levels on the basis of a time zone in which a current time indicated by the time information lies.

16. Equipment as claimed in claim 15, wherein the alert tone is controlled to a medium volume level in the morning, to a high volume level in the daytime, and to a low volume level in the nighttime.

17. Equipment as claimed in claim 15, further comprising displaying means for displaying reception of a call, said volume control means controls said displaying means such that in the nighttime said displaying means displays reception of a call with the alert tone being inhibited.

* * * * *